United States Patent
Nakatani

[11] Patent Number: 5,854,692
[45] Date of Patent: Dec. 29, 1998

[54] FACSIMILE APPARATUS HAVING CONTROL MEANS FOR RECORDING A PRESCRIBED PAGE WHICH HAS NOT BEEN COMPLETELY RECORDED WHEN A TROUBLE DETECTED BY DETECTING MEANS IS SOLVED

[75] Inventor: Munehiro Nakatani, Toyohashi, Japan

[73] Assignee: Minolta Camera Kabushiki Kaisha, Osaka, Japan

[21] Appl. No.: 541,285

[22] Filed: Oct. 10, 1995

Related U.S. Application Data

[63] Continuation of Ser. No. 44,252, Apr. 7, 1993, abandoned.

[30] Foreign Application Priority Data

Apr. 8, 1992  [JP]  Japan ..................... 4-086873

[51] Int. Cl.$^6$ ..................................... H04N 1/32
[52] U.S. Cl. .............................. 358/468; 358/401
[58] Field of Search ................... 358/468, 437, 358/443, 441, 405, 406, 498, 434, 436, 444, 494, 401

[56] References Cited

U.S. PATENT DOCUMENTS

| | | | |
|---|---|---|---|
| 4,811,111 | 3/1989 | Kurokawa | 358/257 |
| 4,920,427 | 4/1990 | Hirata | 358/437 |
| 4,970,599 | 11/1990 | Nobuta | 358/296 |
| 5,010,363 | 4/1991 | Higashio et al. | 355/206 |
| 5,311,327 | 5/1994 | Fukushima | 358/468 |
| 5,335,085 | 8/1994 | Nakatsuma | 358/437 |
| 5,357,345 | 10/1994 | Nakano et al. | 358/437 |
| 5,400,243 | 3/1995 | Oheda et al. | 358/452 |

FOREIGN PATENT DOCUMENTS 4127772  4/1992  Japan ..................... H04N 1/32

OTHER PUBLICATIONS

Canon faxL770 Inst. Bk; p. 54855; 1990.
Canon Fax–L770 Instruction Book, 1990, p. 55.
Nefax D45 Publication.

*Primary Examiner*—Thomas D. Lee
*Assistant Examiner*—Jerome Grant, II
*Attorney, Agent, or Firm*—Sidley & Austin

[57] ABSTRACT

When a jam occurs in outputting an image to a printer in a facsimile apparatus, it is displayed that the printer is in a state of trouble. If the printer trouble is not solved in a prescribed time period, that one group of original being printed is stored in a compressed data memory (not shown) as a re-recording file. When the trouble is solved, the data of that one group of original stored in the re-recording file is output to the printer. As a result, a facsimile apparatus capable of clarifying the destination of the printed received image data after an interruption can be provided.

23 Claims, 9 Drawing Sheets

5,854,692

FACSIMILE APPARATUS HAVING CONTROL MEANS FOR RECORDING A PRESCRIBED PAGE WHICH HAS NOT BEEN COMPLETELY RECORDED WHEN A TROUBLE DETECTED BY DETECTING MEANS IS SOLVED

This application is a continuation of application Ser. No. 08/044,252, filed Apr. 7, 1993, abandoned.

BACKGROUND OF THE INVENTION

1. Field of the Invention

The present invention relates generally to facsimile apparatus, and more specifically, to a facsimile apparatus permitting access to prescribed information on a received image after an interruption of recording of the received image due to some trouble.

2. Description of the Related Art

In conventional facsimile apparatus, so-called memory reception is performed by which received image data is recorded in a memory. After the memory reception, a facsimile apparatus prints out the received image data, and if the printing is interrupted with paper running out in the middle of a page to be printed out, re-printing is started from the next page. Among facsimile apparatus capable of printing out while receiving data, when paper runs out in printing a reception mode is automatically switched to a memory reception mode to start storing data from the next page in some machines.

In a conventional facsimile apparatus, as described above, a page already printed out, if incomplete, will not be recorded once again, even if the page is included in data constituting one original group. Therefore, if the previous printed out sheet paper is not left in the discharge tray of the apparatus, it is sometimes not possible to know where the re-printed document is addressed to.

SUMMARY OF THE INVENTION

It is therefore one object of the invention to record prescribed information if printing is interrupted for some reason in a facsimile apparatus.

Another object of the invention is to record prescribed information after a trouble occurs, in a facsimile apparatus.

Yet another object of the invention is to provide a facsimile apparatus capable of notifying the receiver of the destination of printed received image data after an interruption of the printing.

The above-described objects of the invention are achieved by a facsimile apparatus including a memory for storing received information and a detector for detecting the occurrence of and the recovery from a trouble. More specifically, when a trouble occurs and the recovery from the trouble is detected, prescribed information is read out from the memory. Thus, recording of the read out prescribed information is permitted if printing is interrupted by some trouble.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, embodiments of the invention will be described in conjunction with the accompanying drawings.

(1) First Embodiment

Figure 1:
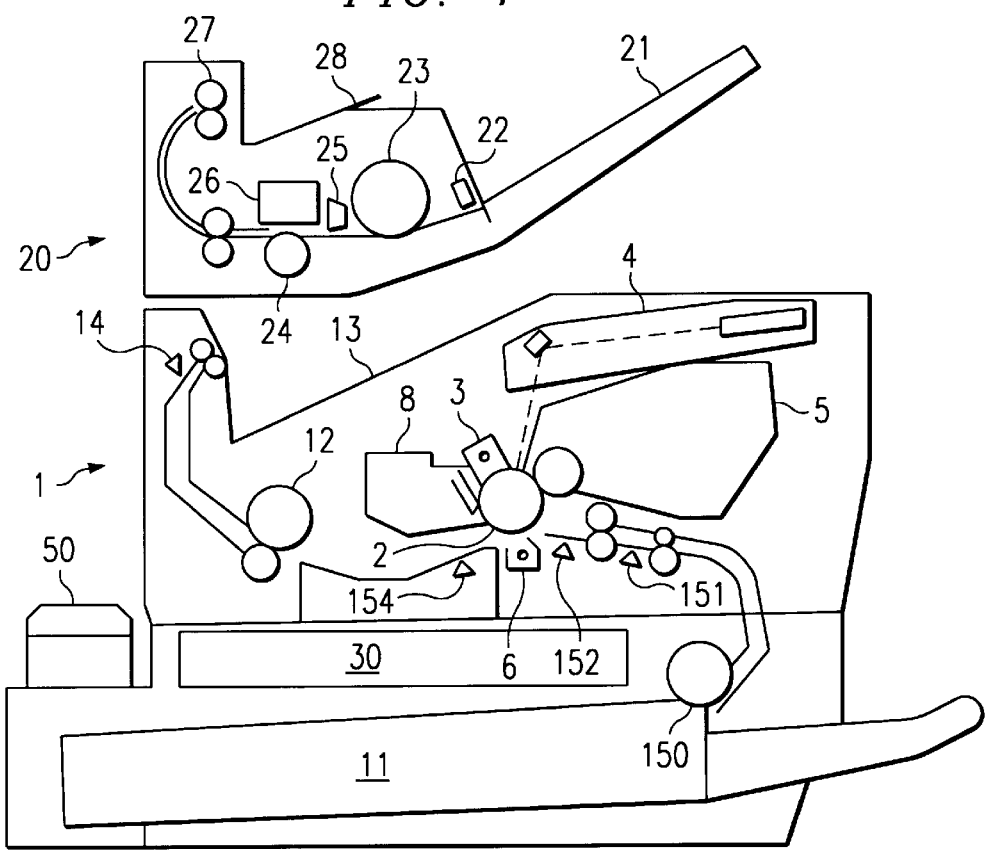
FIG. 1 is a cross sectional view schematically showing a facsimile apparatus to which the invention is applied.

FIG. 1 is a cross sectional view showing a facsimile apparatus to which the invention is applied. The facsimile apparatus is roughly divided into a printer 1 and a reading unit 20 disposed thereon.

Printer 1 is a laser beam printer, and the operation thereof will briefly be described. A photoreceptor on a photoreceptor drum 2 driven to rotate is uniformly charged by a corona charger 3. Then, a laser beam is emitted by an optical system 4 according to image data and an electrostatic latent image is formed on photoreceptor drum 2. Toner in a developer 5 sticks to the electrostatic latent image. Cut paper is placed in a paper feed cassette 11 and is sent toward photoreceptor drum 2 on a sheet-by-sheet basis. The toner sticking to photoreceptor drum 2 is transferred onto the cut paper by a transfer charger 6 and fixed by a fixing unit 12, and then the cut paper is discharged onto a tray 13. Toner not sticking to the drum is collected by a cleaner 8, and thus one procedure of printing is completed.

Now, the operation of reading unit 20 will be described. Reading of transmitted original is performed in the same manner as a conventional technique. More specifically, an original placed on an original tray 21 is detected by a sensor 22 and sent by a roller 23 on a sheet-by-sheet basis to the position of sensor 25. Then the original is read by a linear image sensor 26 of a close contacting type, with the rotation of roller 24 being in synchronization with the reading of linear image sensor 26 by a motor which is not shown, and the original image is converted into digital image data. After the reading is completed, the original is discharged onto a discharge unit 28 by a discharge roller 27.

The facsimile apparatus further includes a communication controller 30 including a control block necessary for communication processing, a handset 50 provided for telecommunication and an operation unit (not shown) for operating these units.

Figure 2:
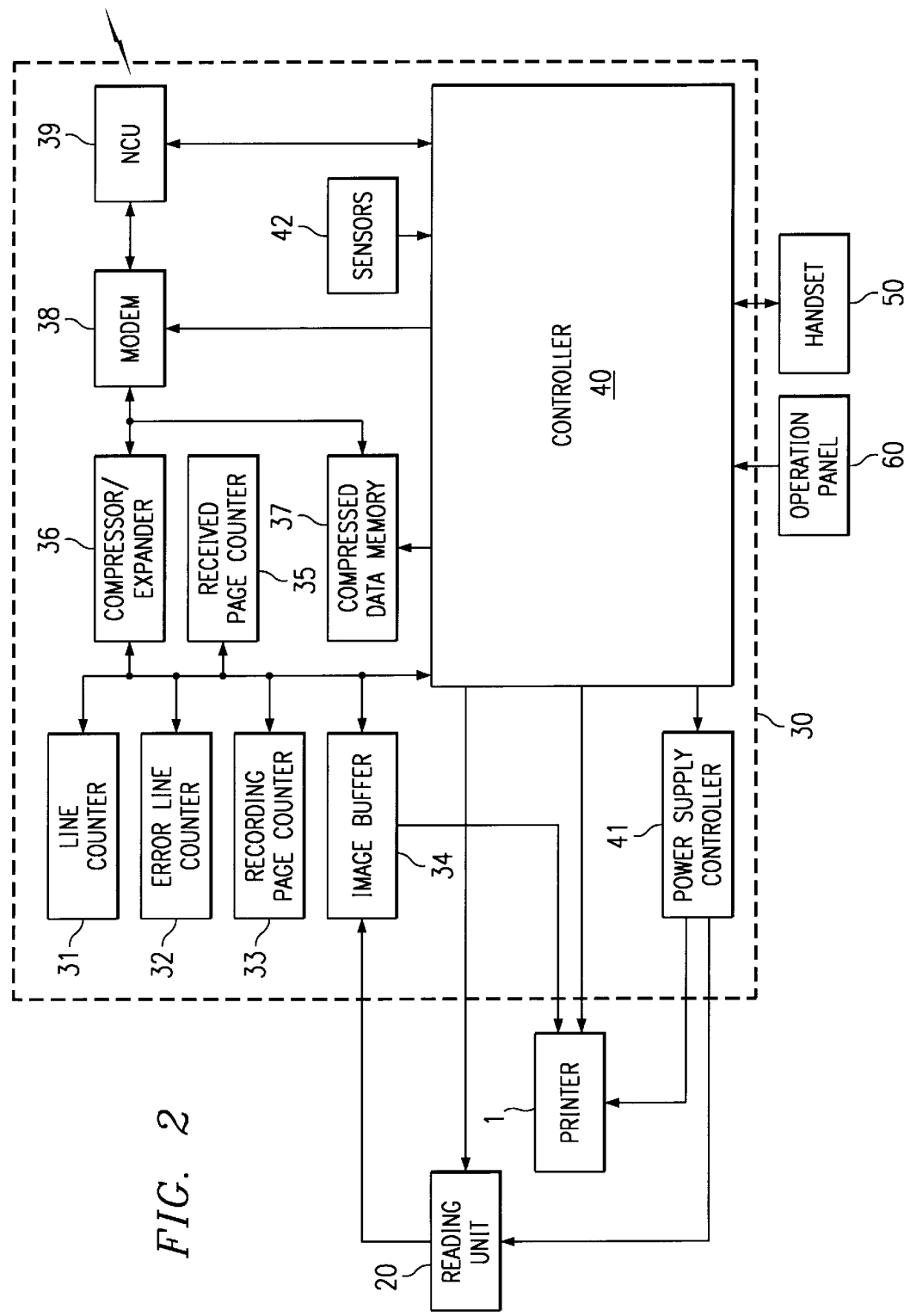
FIG. 2 is a block diagram showing an essential part including a communication controller in a facsimile apparatus to which the invention is applied.

FIG. 2 is a block diagram showing the relation between the content of communication controller 30 in a facsimile apparatus to which the invention is applied and its peripheral units. Referring to FIG. 2, communication control 30 includes a controller 40 for controlling the entire communication controller 30 and an NCU (Network Control Unit) 39 connected to a telephone line for receiving/transmitting data. A receiving signal from NCU 39 is sent to a compressor/expander 36 or a compressed data memory 37 through a modem 38. Connected to controller 40 are various counters 31–33, an image buffer 34 for storing an image, a power supply controller 41, and various sensors 42, which will be described later.

Printer 1, reading unit 20, handset 50 and an operation panel 60 are also connected to controller 40.

Figure 3:
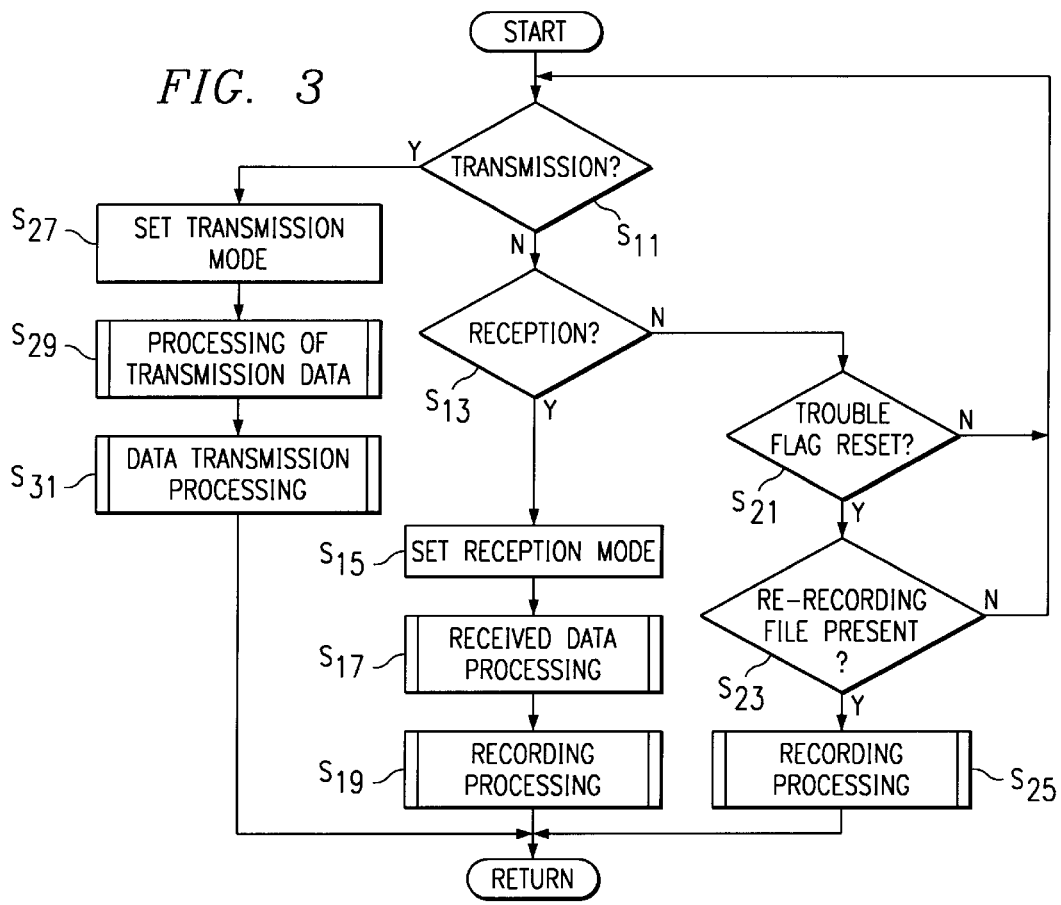
FIG. 3 is a flow chart for use in illustration of the overall operation of a facsimile apparatus.

FIG. 3 is a flow chart for use in illustration of the overall operation of a facsimile apparatus according to the invention. Referring to FIG. 3, a determination is made whether a transmission operation or a reception operation is presently performed in the facsimile apparatus (S1, S13), and depending upon each of the operations, if reception is going on, for example (N in S11 and Y in S13), the apparatus is set to a reception mode (S15). More specifically, upon receiving a signal from NCU 39, controller 40 sets a reception mode including communication speed, density, size, etc. according to a prescribed preceding procedure. Subsequently, a reception data processing and a recording processing which will be described in detail are performed (S17, S19).

In the case of the transmission mode (Y in S1), the apparatus is set to the transmission mode, and a processing of transmission data and a data transmission processing are performed (S27–S31).

If the apparatus is not in the state of reception (N in S13), a determination is made as to whether or not a trouble flag is reset with a trouble such as paper jam or paper running out being solved (S21). If it is determined that the trouble flag is reset (Y in S21), the presence/absence of a re-recording file is determined, which will be described later. If it is determined that a re-recording file is present (Y in S23), a recording processing is performed. This will be described later in detail.

If it is determined that the trouble flag is not reset in S21 or that there is not a re-recording file in S23 (N in S21 or S23), the program proceeds to S11.

Figure 5:
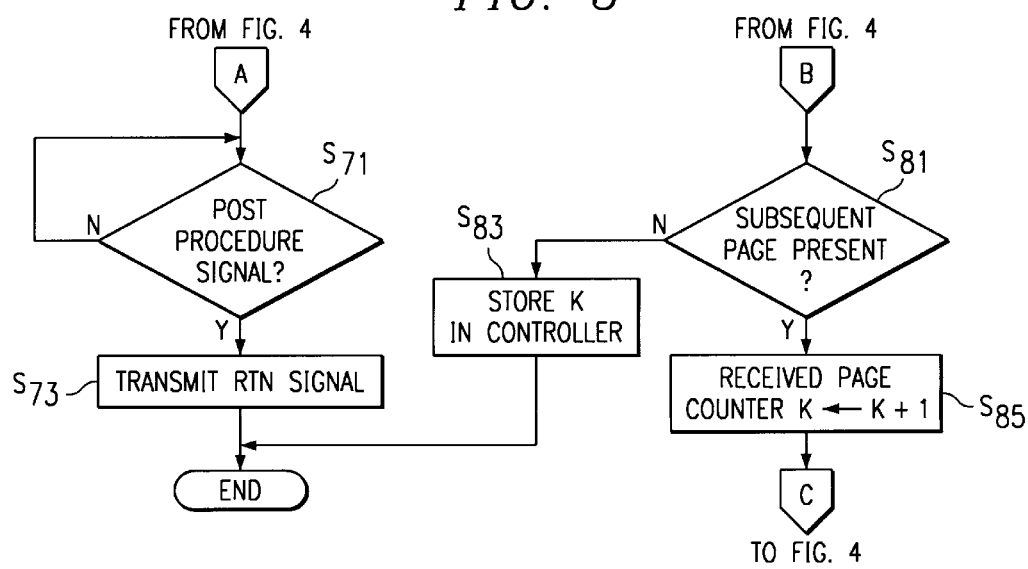
FIGS. 4 and 5 are flow charts each for use in illustration of processing of received data subroutine.
Figure 4:
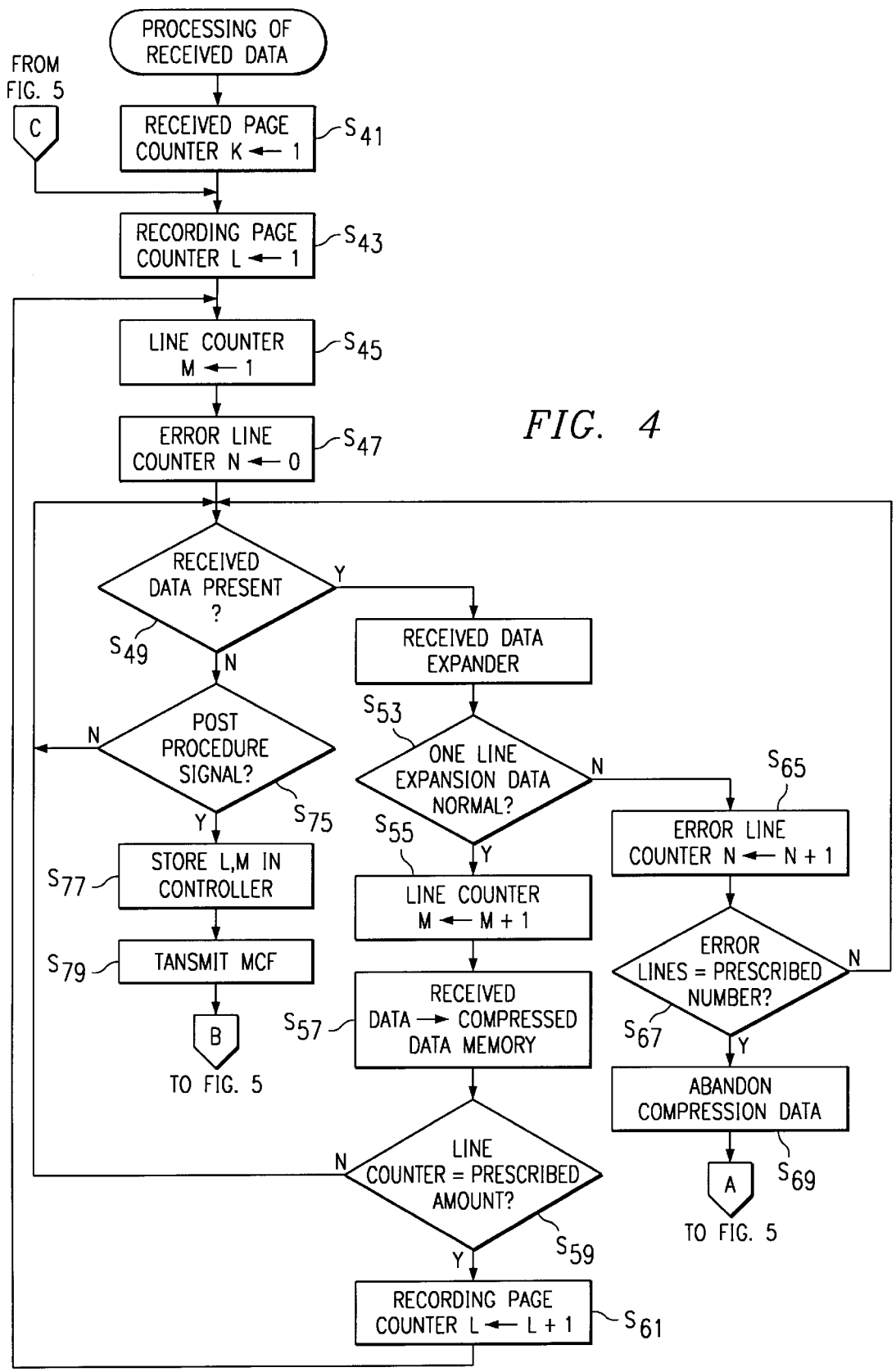

FIGS. 4 and 5 are flow charts each for use illustration of the content of the processing of received data in S17 in FIG. 3. Referring to FIGS. 2, 4, and 5, the content of the received data processing will be described.

Upon entering the processing of received data, a received page counter 35, a recording page counter 33, a line counter 31 and an error line counter 32 are initialized (S41–S47). Received page counter 35 and recording page counter 33 are each incremented by 1 by a page signal transmitted from the transmission side depending upon a judgement on the reception side.

The reception data received through NCU 39 and modem 38 are first sent to compressor/expander 36 for a expansion processing (S49, S51). In the expansion processing, the received data demodulated according to a prescribed code algorithm is expanded into actual data. At that time, if an error is generated in the received data, the number of dots per one line of the expanded data is not equal to a prescribed number, and therefore a determination as to the presence/absence of an error line is made by determining whether or not they match (S53).

If an error is determined (N in S53), error line counter 32 is counted up (S65), and the program returns to S49; provided however, the number of error lines does not equal a prescribed number (N in S67).

If it is determined that there is not any error (Y in S53), line counter 31 is counted up and compressed data corresponding to the received line is stored in compressed data memory 37 (S55, S57). The operation described above is repeated (N in S59) and when the value of the line counter reaches a prescribed number (Y in S59), the recording page counter is counted up (S61) and the same operation is continued.

When a post procedure signal is received after the data ends (N in S49 and Y in S75), the values L and M of the recording page counter and the line counter are stored in controller 40, and a signal MCF indicating that the reception has been normally made is transmitted (S77, S79). If there is a subsequent page, received page counter 35 is counted up and the reception processing is continued (Y in S81, S85).

When the number of error lines reaches a prescribed number in S67 (Y in S67), compressed data in the same page is abandoned, then a post procedure signal is waited for and a response signal RTN indicating that the reception has not been normally made is transmitted (S69–S73).

When processing of the final reception page is completed (N in S81), the number of received data pages K is stored in controller 40, and then the reception processing is completed.

Figure 6:
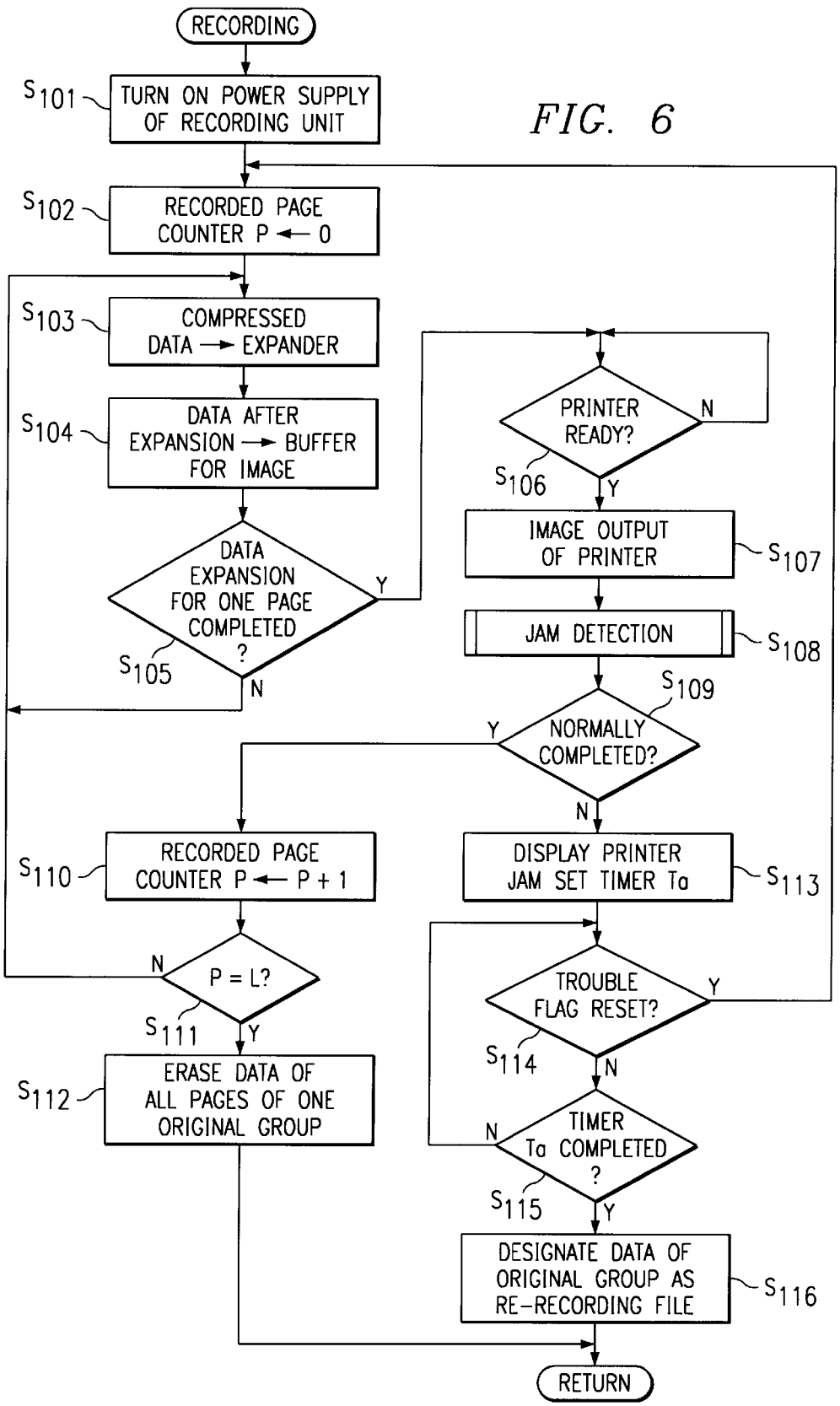
FIG. 6 is a flow chart for use in illustration of a recording subroutine.

The recording processing illustrated in S19 in FIG. 3 will be described in conjunction with FIGS. 2 and 6. FIG. 6 is a flow chart for use in illustration of First Embodiment showing "recording processing" according to the invention.

In S101, the power supply of the recording unit is turned on, to start the operation. The value of a recorded page counter P for counting recorded pages is set to "0" in S102. Then, compressed data is expanded and stored in buffer 34 for image (S103, S104). When data expansion for 1 page is completed and a print enable stage is detected, the image is output to the printer (S105–S107).

When recording by printer 1 is normally completed (without the occurrence of a printer error such as jam) (Y in S109), the value of recorded page counter P is incremented in S110. If a coincidence is found between the value P of recorded page counter and the value L of recording page counter 33 in S111 (Y in S111), which indicates all the pages of one original group have been printed out, the page data of that group is erased from the memory. If the printing is not completed (N in S111), the program returns to S103, entering a printing operation of the next page data.

It is noted that in the embodiment, the page data of one original group is printed out from the first page, and the value of recorded page counter P=1 indicates that the data of the first page of that one original group has been completed.

If it is determined that a jam occurs in S109, the information is displayed and a timer Ta is started (S113). Upon detecting a jam, no processing is performed during the operation of timer Ta (S114, S115), the data of that original group is stored in compressed data memory 37 as the data for a re-recording file (S116). When the trouble flag is reset in a prescribed time period in S114, the program returns to S102 and starts printing out the data once again from the first page.

In the embodiment, recording is resumed from the first page after a trouble solution, but if the value of timer Ta is small, the program may return to S103 and start recording from the page hit with the jam.

The recording processing of the area which is not output is recorded in S25 when Y is indicated in "re-recording file present?" (S23) in the entire flow shown in FIG. 3.

A re-recording need file flag is set in that one group of original data stored in compressed data memory 37 as the re-recording file. The presence/absence of that flag is checked depending upon a determination in step (S23)

"re-recording file present?" in FIG. 3. If the re-recording need file flag is set (Y in S23), the program proceeds to the flow shown in FIG. 6, and performs a determination of "printer ready?" (S106). If the answer to the determination is Y, corresponding re-recording file data is printed out by printer 1 (S109). When the printing out is completed, all the data included in the corresponding one original group is erased and the re-recording need file flag is reset (Y in S109, S110–S112).

Now, a jam detection subroutine shown in S108 in FIG. 6 will be described in conjunction with FIGS. 1, and 7–9.

Figure 7:
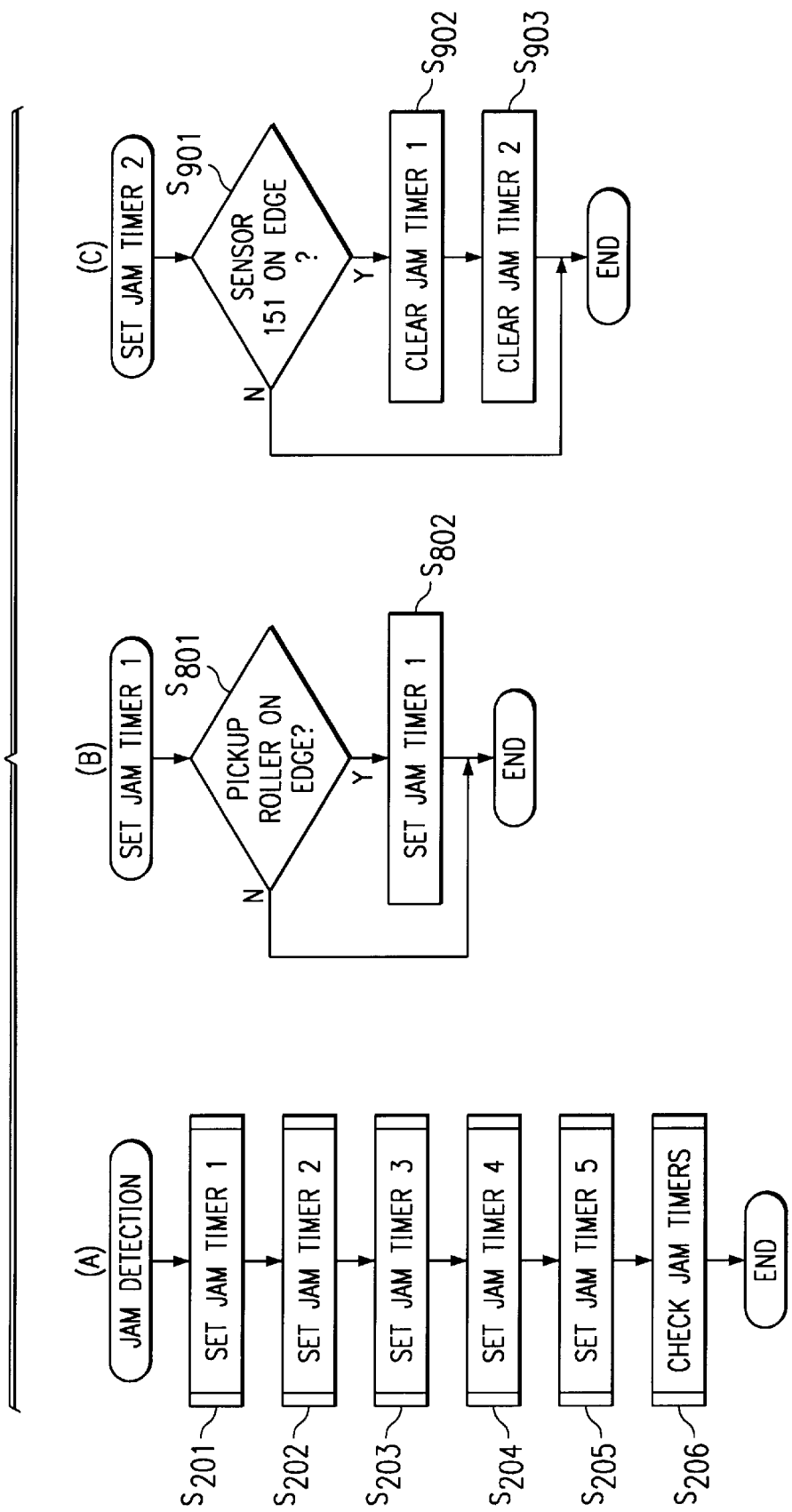
FIG. 7 illustrates flow charts for use in illustration of a jam detection routine.
Figure 8:
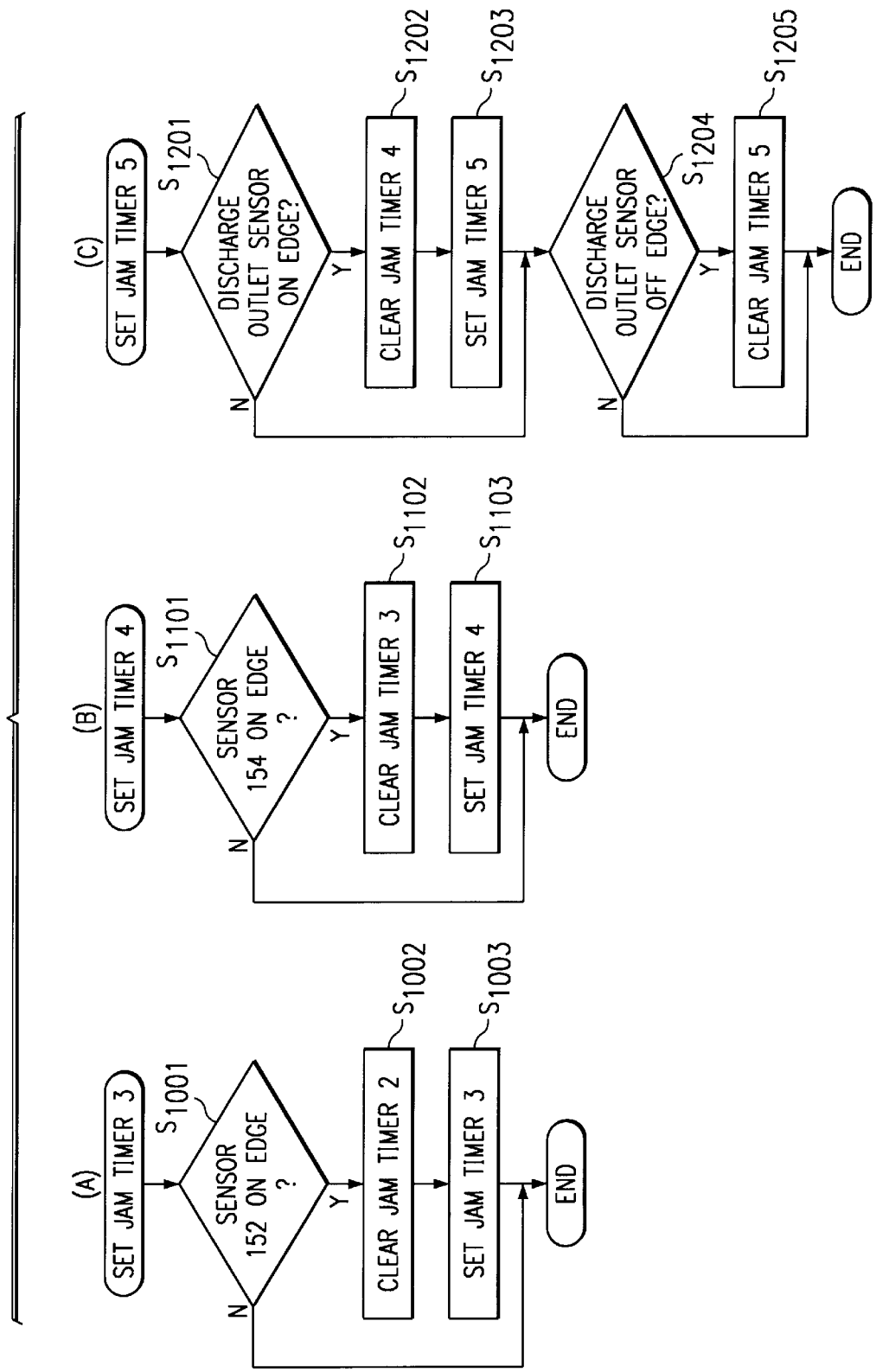
FIGS. 8 and 9 are flow charts each for illustration of a plurality of set jam timer subroutines.
Figure 9:
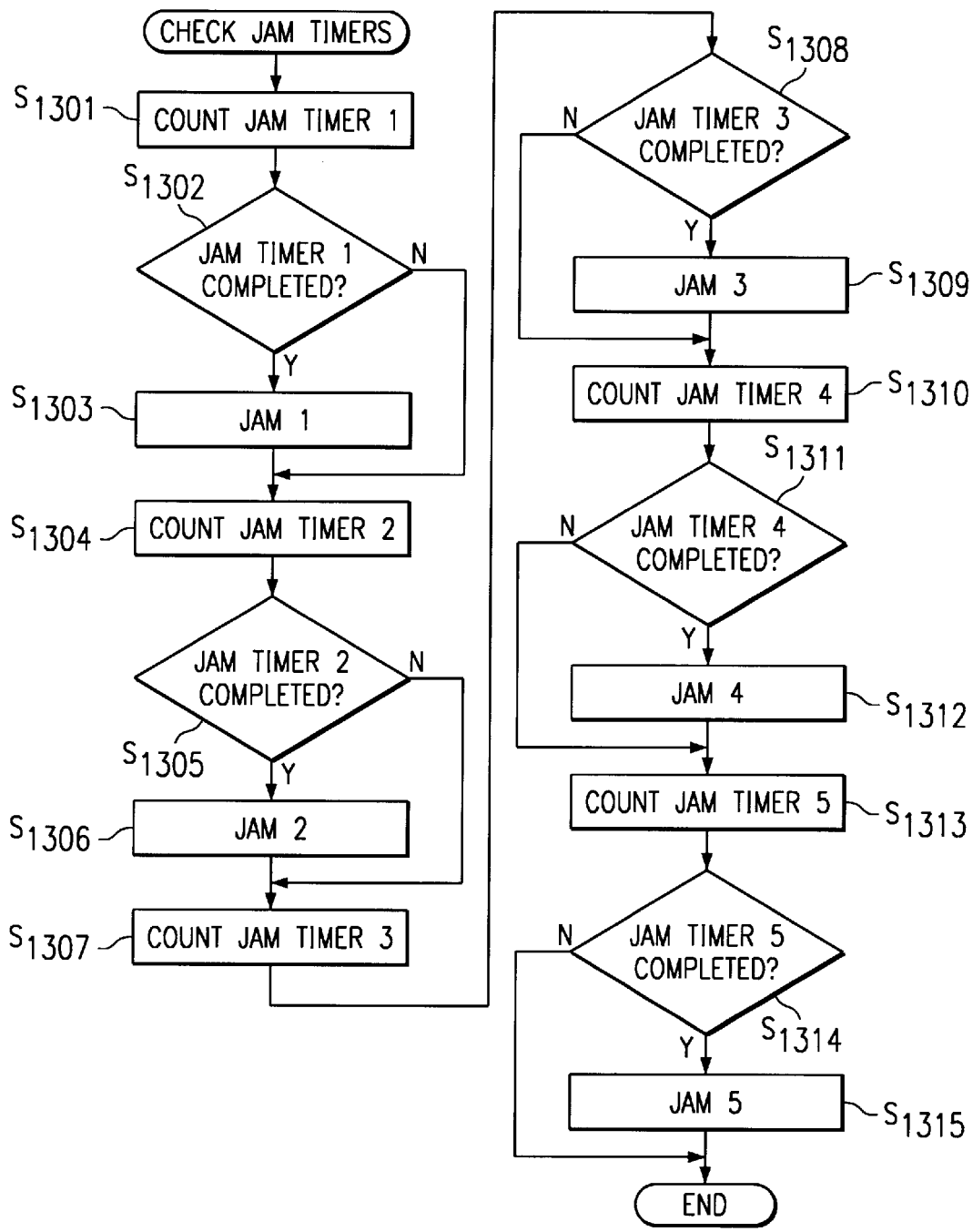

In the jam detection subroutine, as illustrated in FIG. 7 at (A), jam timers 1–5 are subjected to jam timer checking (S201–S206). "Set jam timer 1" is set when a pickup roller 150 is activated. More specifically, when the on-edge (change in status from the off status to the on status) of pickup roller 150 is detected (Y in S801), jam timer 1 is set (S802). As for "set jam timer 2", when the on-edge of a sensor 151 is (Y in S901), jam timer 1 is cleared (S902)and then jam timer 2 is set (S903).

As for "set jam timer 3", when the on edge of a sensor 152 is Y in S1001), jam timer 2 is cleared (S1002) and then jam timer 3 is set (S1003). As for "set jam timer 4", when the on-edge of a sensor 154 is detected, jam timer 3 is cleared and then jam timer 4 is set (Y in S1101, S1102, S1103).

As for "set jam timer 5", when the on edge of a sensor 14 provided at a discharge outlet is (Y in S1201), jam timer 4 is cleared (S1202) and then jam timer 5 is set (S1203). When the off edge of the discharge outlet sensor is (Y in S1204), jam timer 5 is cleared (S1205).

In "check jam timer" in S206, checking is sequentially executed to jam timer 1 (S1301–S1303), jam timer 2 (S1304–S1306), jam timer 3 (S1307–S1309), jam timer 4 (S1310–S1312), and jam timer 5 (S1313–S1315). The checking includes detecting a jam occurrence by confirming that the counter of each jam timer is counted up.

(2) Second Embodiment

Figure 10:
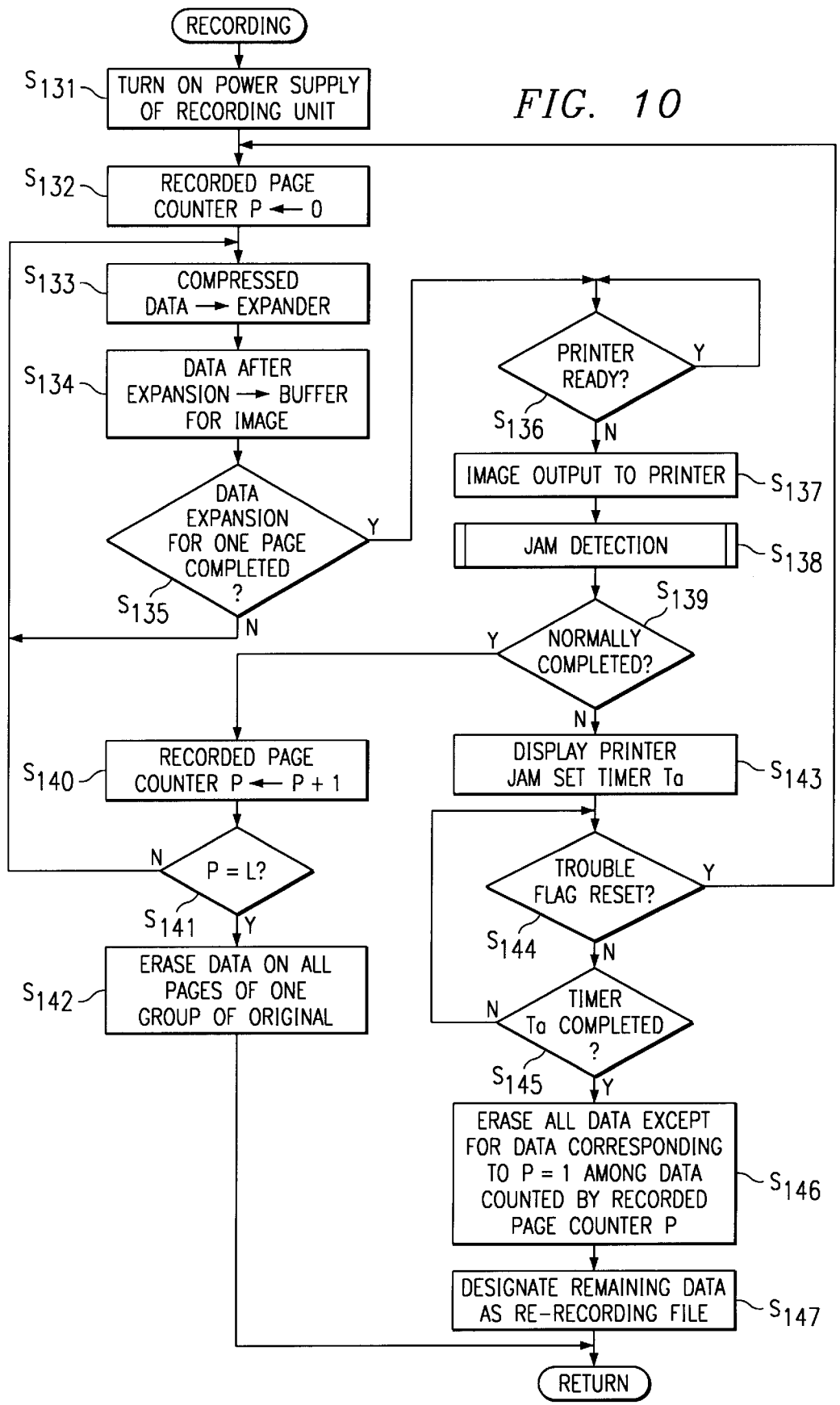
FIG. 10 is a flow chart for use in illustration of a recording subroutine according to a second embodiment of the invention.

A second embodiment of the invention will be described in conjunction with FIG. 10. FIG. 10 is a flow chart for use illustration of a recording processing corresponding to FIG. 6 according to the first embodiment.

In the second embodiment of the invention, in received data of a plurality of pages forming one group of originals, data for page P=2 to P=N−1 (the Nth page being the page in which the jam occurred) is erased, leaving in memory the data of not yet recorded pages, the first page, and the N-th page.

Referring to FIG. 10, among the steps of S131–S147, only S146 and S147 are different from FIG. 6 illustrating the first embodiment. More specifically, in the second embodiment of the invention, among the received data formed of a plurality of pages, only the not yet recorded pages, the first page, and the N-th page are left in compressed data memory 37 as a re-recording file when a jam occurs in the N-th page and the other already recorded pages are erased.

In usual facsimile transmission, the destination is usually transmitted with the first page or the last page. Accordingly, if at least both pages are obtained, the destination can be specified and known.

The structure of the facsimile apparatus, the overall flow chart, the received data processing sub routine and the jam detection sub routine or the like are the same as those in the first embodiment, and therefore detailed description thereof will not be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus, comprising:

storage means for storing received image data;

recording means for extracting said image data stored in said storage means sequentially from a first page on a page-by-page basis and for recording the image data on recording paper in a recording operation;

detection means for detecting a trouble occurrence during the recording operation of said recording means; and control means for controlling said recording means to again record a prescribed page which has already been recorded and to record one or more pages of the image data stored in said storage means which has not been completely recorded, when a trouble detected by said detection means is solved.

2. An apparatus as recited in claim 1, wherein said control means controls said recording means to extract the image data stored in said storage means sequentially from the first page on a page-by-page basis and record the extracted image data on said recording paper.

3. An apparatus as recited in claim 2, wherein said control means includes a timer for counting a prescribed time period from the trouble occurrence detected by said detection means and controls said recording means to resume recording of the image data from the page hit with said trouble, when said trouble is solved before counting of said prescribed time period by the timer is completed.

4. An apparatus as recited in claim 1, wherein said control means controls said recording means to again record the first page and to record pages which have not been yet recorded of the image data stored in said storage means.

5. An apparatus as recited in claim 4, wherein said control means includes a timer for counting a prescribed time period from the trouble occurrence detected by said detection means and controls said storage means to erase the image data of pages which have been recorded by said recording means except for said first page after the counting of said prescribed time period by said timer is completed.

6. An apparatus as recited in claim 5, wherein said control means controls said recording means to resume recording from the page hit with said troubles when the trouble detected by said detection means is solved before the counting of said prescribed time period by said timer is completed.

7. An apparatus as recited in claim 4, further comprising:

compression/expansion means for expanding received image data in a compressed state, for compressing the image data before being stored in said storage means and for expanding the image data which said recording means extracts from said storage means for recording.

8. An apparatus as recited in claim 4, wherein said first page includes user destination information for the received image data.

9. A facsimile apparatus comprising:

storage means for storing received image data;

recording means for extracting said image data stored in said storage means sequentially from a first original page on a page-by-page basis and for recording the extracted image data on recording paper in a recording operation;

detection means for detecting a trouble occurrence during the recording operation of said recording means; and control means for controlling said storage means to erase the image data of pages which have already been recorded by said recording means except for said first original page when said detection means detects a trouble, and for controlling said recording means to record the image data stored in said storage means when the detected trouble is solved.

10. An apparatus as recited in claim 9, wherein said control means includes a timer for counting a prescribed time period from the trouble occurrence detected by said detection means and controls said storage means to erase the image data of pages which have been recorded by said recording means except for said first page after the counting of said prescribed time period by the timer is completed.

11. An apparatus as recited in claim 10, wherein said control means controls said recording means to resume recording from the page hit with said trouble, when the trouble detected by said detection means is solved before the counting of said prescribed time period by said timer is completed.

12. An apparatus as recited in claim 11, further comprising:

compression/expansion means for expanding received image data in a compressed state, for compressing the image data before being stored said in storage means, and expanding the image data extracted from said storage means for recording by said recording means.

13. An apparatus as recited in claim 9, wherein said first page includes user destination information for the received image data.

14. A facsimile apparatus, comprising:

storage means for storing received image data;

recording means for extracting said image data stored in said storage means on a page-by-page basis and for recording the extracted image data on recording paper in a recording operation;

detection means for detecting a trouble occurrence during the recording operation of said recording means; and control means for controlling said storage means to store a portion of the image data subject to a recording operation in said storage means as image data to be recorded later only when said detection means detects a trouble occurrence and for controlling said recording means to later record the image data to be recorded later stored in said storage means when the detected trouble is solved.

15. An apparatus as recited in claim 14, wherein said control means stores the image data of all the pages in said storage means as image data to be recorded later.

16. An apparatus as recited in claim 15, wherein said control means controls said recording means to record the image data of all the pages stored in said storage means when the detected trouble is solved.

17. An apparatus as recited in claim 15, wherein said control means controls said recording means to record the image data of pages which have not been recorded and at least one prescribed page, which was previously recorded, stored in said storage means when the detected trouble is solved.

18. An apparatus as recited in claim 17, wherein the at least one prescribed page is a first page of said image data.

19. An apparatus as recited in claim 18, wherein said first page includes user destination information for the received image data.

20. An apparatus as recited in claim 14, wherein said control means stores the image data of pages which have not been recorded and the image data of a least one prescribed page which has previously been recorded as image data to be recorded later in said storage means.

21. An apparatus as recited in claim 20, wherein said control means controls said recording means to record all the image data stored in said storage means when the detected trouble is solved.

22. An apparatus as recited in claim 20, wherein the at least one prescribed page of said image data is the first page of said image data.

23. An apparatus as recited in claim 20, wherein the at least one prescribed page of said image data includes user destination information.

* * * * *